(12) United States Patent
Sugiyama et al.

(10) Patent No.: US 11,630,064 B2
(45) Date of Patent: Apr. 18, 2023

(54) SAMPLE OBSERVATION DEVICE AND SAMPLE OBSERVATION METHOD

(71) Applicant: HAMAMATSU PHOTONICS K.K., Hamamatsu (JP)

(72) Inventors: Norikazu Sugiyama, Hamamatsu (JP); Masanori Matsubara, Hamamatsu (JP); Satoshi Yamamoto, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 17/488,659

(22) Filed: Sep. 29, 2021

(65) Prior Publication Data

US 2022/0034811 A1 Feb. 3, 2022

Related U.S. Application Data

(63) Continuation of application No. 16/629,202, filed as application No. PCT/JP2018/015972 on Apr. 18, 2018, now Pat. No. 11,169,092.

(30) Foreign Application Priority Data

Jul. 11, 2017 (JP) ................................. 2017-135423

(51) Int. Cl.
  *G01N 21/64* (2006.01)
  *G01N 21/51* (2006.01)
  *G01N 21/17* (2006.01)

(52) U.S. Cl.
  CPC ......... *G01N 21/6456* (2013.01); *G01N 21/51* (2013.01); *G01N 2021/1738* (2013.01); *G01N 2021/6471* (2013.01)

(58) Field of Classification Search
  CPC .... G01N 21/88; G01N 21/8806; G01N 21/91; G01N 21/9501; G01N 21/9503;
  (Continued)

(56) References Cited

U.S. PATENT DOCUMENTS 6,051,835 A 4/2000 Pettipiece et al.
6,603,537 B1 8/2003 Dietz et al.
(Continued)

FOREIGN PATENT DOCUMENTS

AU 2016241935 A1 * 10/2017 ............... G01N 1/14
CN 102667473 A 9/2012
(Continued)

OTHER PUBLICATIONS

Schicktanz, Simone et al., "Image-based Quantification of Apoptosis using the Operetta," Perkin Elmer, Application Note, 2009, pp. 1-4.
(Continued)

*Primary Examiner* — Michael P Stafira
(74) *Attorney, Agent, or Firm* — Faegre Drinker Biddle & Reath LLP

(57) ABSTRACT

A sample observation device includes an irradiation unit that irradiates a sample with planar light, a scanning unit that scans the sample in one direction with respect to an irradiation surface of the planar light, an image formation unit that forms images of fluorescent light and scattered light from the sample, an imaging unit that outputs first image data based on a light image of the fluorescent light and second image data based on a light image of the scattered light, an image processing unit that generates a fluorescent light image on the basis of a plurality of pieces of first image data and generates a scattered light image on the basis of a plurality of pieces of second image data, and an analysis unit that specifies an area in which there is the sample in the
(Continued)

fluorescent light image on the basis of the scattered light image, and sets an analysis area in the fluorescent light image on the basis of the area in which there is the sample.

8 Claims, 12 Drawing Sheets

(58) Field of Classification Search
CPC ......... G01N 21/956; G01N 2201/0461; G01N 2201/129; G01N 2223/076; G01N 23/18; G01N 23/223; G01N 2333/495; G01N 33/02; G01N 33/15; G01N 33/22; G01N 33/4833; G01N 33/4905; G01N 33/5076; G01N 33/5438; G01N 33/561; G01N 33/569; G01N 33/86; G01N 2021/8466; G01N 21/3563; G01N 23/043; G01N 23/083; G01N 2223/31; G01N 2223/321; G01N 2223/6116; G01N 23/225; G01N 23/2251; G01N 29/22; G01N 2001/386; G01N 2021/6432; G01N 2021/8905; G01N 2021/8967; G01N 2035/00277; G01N 2035/00287; G01N 2035/00346; G01N 2035/00366; G01N 21/00; G01N 21/21; G01N 21/55; G01N 21/763; G01N 21/896; G01N 21/9018; G01N 21/9036; G01N 21/9045; G01N 21/952; G01N 21/958; G01N 2203/0066; G01N 2203/0652; G01N 2203/0682; G01N 2291/0234; G01N 2291/057; G01N 2291/106; G01N 2291/2632; G01N 2291/2675; G01N 23/04; G01N 23/16; G01N 23/203; G01N 23/207; G01N 29/262; G01N 29/265; G01N 3/068; G01N 33/493; G01N 33/6848; G01N 33/6851; G01N 35/0098; G01N 35/0099; G01N 35/1009; G01N 35/1079
See application file for complete search history.

(56) References Cited

U.S. PATENT DOCUMENTS

| | | | |
|---|---|---|---|
| 7,217,573 B1 | 5/2007 | Oshida et al. | |
| 8,246,803 B2* | 8/2012 | Yamazaki | G01N 27/44721 |
| | | | 204/603 |
| 8,582,203 B2 | 11/2013 | Dunsby | |
| 8,969,790 B1* | 3/2015 | Akselrod | G01N 23/22 |
| | | | 250/252.1 |
| 10,145,795 B2* | 12/2018 | Saitou | G01N 21/6456 |
| 2004/0219627 A1 | 11/2004 | Kawashima | |
| 2006/0170912 A1 | 8/2006 | Mueth et al. | |
| 2006/0275891 A1 | 12/2006 | Kishida et al. | |
| 2007/0139764 A1* | 6/2007 | Vodyanoy | G02B 21/10 |
| | | | 359/389 |
| 2009/0091746 A1 | 4/2009 | Fukuda et al. | |
| 2009/0310122 A1 | 12/2009 | Hamada et al. | |
| 2010/0238442 A1 | 9/2010 | Heng et al. | |
| 2010/0321484 A1* | 12/2010 | Kishima | G01N 21/6458 |
| | | | 348/79 |
| 2011/0280467 A1* | 11/2011 | George | G06V 20/698 |
| | | | 382/133 |
| 2013/0050782 A1 | 2/2013 | Heng et al. | |
| 2013/0129181 A1 | 5/2013 | Glensbjerg et al. | |
| 2013/0201317 A1* | 8/2013 | Ortyn | A61B 1/00188 |
| | | | 348/77 |
| 2014/0273188 A1* | 9/2014 | Mohan | G02B 21/125 |
| | | | 422/82.05 |
| 2014/0339446 A1 | 11/2014 | Yamamoto et al. | |
| 2014/0370586 A1 | 12/2014 | Seo et al. | |
| 2016/0356717 A1 | 12/2016 | Fujii et al. | |
| 2017/0153182 A1 | 6/2017 | Matsuo et al. | |
| 2017/0261731 A1 | 9/2017 | Shimada et al. | |
| 2017/0268981 A1* | 9/2017 | Diebold | G01N 15/147 |
| 2018/0045646 A1* | 2/2018 | Sheen | G01N 15/1468 |
| 2018/0202935 A1* | 7/2018 | Bahlman | G02B 21/0076 |
| 2019/0163956 A1 | 5/2019 | Li et al. | |
| 2019/0302000 A1 | 10/2019 | Lo et al. | |

FOREIGN PATENT DOCUMENTS

| | | | | |
|---|---|---|---|---|
| CN | 102939555 A | | 2/2013 | |
| CN | 104142287 A | * | 11/2014 | ............. G01N 21/65 |
| EP | 0644419 A2 | * | 3/1995 | |
| EP | 1729113 A1 | | 12/2006 | |
| JP | 2005-24532 A | | 1/2005 | |
| JP | 2005-181145 A | | 7/2005 | |
| JP | 2006-509246 A | | 3/2006 | |
| JP | 2010-72014 A | | 4/2010 | |
| JP | 2013-507612 A | | 3/2013 | |
| WO | WO-9214137 A1 | * | 8/1992 | ............. G01N 21/51 |
| WO | WO 2004/053558 A1 | | 6/2004 | |
| WO | WO-2007070382 A2 | * | 6/2007 | ......... G01N 21/6458 |
| WO | WO 2011/046807 A2 | | 4/2011 | |
| WO | WO-2015151812 A1 | * | 10/2015 | ............ G01J 3/0208 |

OTHER PUBLICATIONS

International Preliminary Report on Patentability dated Jan. 23, 2020 for PCT/JP2018/015972.
John A. Carucci et al., "Line-scanning, stage scanning confocal microscope", Progress in Biomedical Optics and Imaging, SPIE—International Society for Optical Engineering, Bellingham, WA, US, vol. 9703, Mar. 7, 2016, p. 97030F, XP060065011.
I. D. Walton et al., "Particle for Multiplexed Analysis in Solution: Detection and Identification of Striped Metallic Particles Using Optical Microscopy", Analytical Chemistry, American Chemical Society, vol. 74, No. 10, May 15, 2002, p. 2240-p. 2247, XP001128111.

* cited by examiner

SAMPLE OBSERVATION DEVICE AND SAMPLE OBSERVATION METHOD

CROSS-REFERENCE TO RELATED APPLICATIONS

This application is a continuation of U.S. patent application Ser. No. 16/629,202, filed Jan. 7, 2020, which is 371 of International Patent Application No. PCT/JP2018/015972, filed Apr. 18, 2018, which claims the benefit of priority to Japanese Patent Application No. 2017-135423, filed Jul. 11, 2017, the contents of each of which is incorporated herein by reference.

TECHNICAL FIELD

The present disclosure relates to a sample observation device and a sample observation method.

BACKGROUND ART

An example of a technology for observing a sample such as a cell includes a scheme described in Non-Patent Literature 1. In this scheme of the related art, a cell nucleus is stained with a fluorescent substance, and a position of the cell nucleus is specified on the basis of a fluorescent light image obtained by exciting the fluorescent substance. An area in which there is a sample is estimated on the basis of the specified position of the cell nucleus, and an analysis area is set.

PRIOR ART LITERATURE

Non-Patent Literature

[Non-Patent Literature 1] Perkin Elmer APPLICATION NOTE, "Image-based Quantification of Apoptosis using the Operetta"

SUMMARY OF INVENTION

Technical Problem

In the scheme of the related art described above, the area in which there is the sample is only estimated on the basis of the position of the cell nucleus, and it is difficult to say that the accuracy of specifying the analysis area is sufficient. In order to accurately perform analysis of the sample on the basis of an intensity of the fluorescent light, a technology capable of specifying the analysis area with sufficient accuracy is necessary.

The present disclosure has been made to solve the above-described problems, and an object of the present disclosure is to provide a sample observation device and a sample observation method capable of specifying an analysis area with sufficient accuracy.

Solution to Problem

A sample observation device according to an aspect of the present disclosure is a sample observation device for observing a sample held in a sample container using fluorescent light, and includes an irradiation unit that irradiates the sample with planar light; a scanning unit that scans the sample in one direction with respect to an irradiation surface of the planar light; an image formation unit that forms images of fluorescent light and scattered light generated in the sample due to the irradiation with the planar light; an imaging unit that captures at least a part of a light image of the fluorescent light formed by the image formation unit and outputs first image data, and captures at least a part of a light image of the scattered light formed by the image formation unit and outputs second image data; an image processing unit that generates a fluorescent light image on the basis of a plurality of pieces of first image data obtained for the one direction and generates a scattered light image on the basis of a plurality of pieces of second image data obtained for the one direction; and an analysis unit that specifies an area in which there is the sample in the fluorescent light image on the basis of the scattered light image, sets an analysis area in the fluorescent light image on the basis of the area in which there is the sample, and analyzes an intensity of the fluorescent light in the analysis area.

This sample observation device generates the fluorescent light image on the basis of the fluorescent light from the sample, and generates the scattered light image on the basis of the scattered light from the sample. From the scattered light image, a contour shape of the sample can be specified. Therefore, an area in which there is the sample can be specified with sufficient accuracy from the contour shape of the sample specified on the basis of the scattered light image. The analysis of the sample can be performed with high accuracy by setting the analysis area on the basis of the specified area in which there is the sample in the fluorescent light image and obtaining the intensity of the fluorescent light of the analysis area.

Further, the image formation unit may include a switching unit that switches between a first optical filter that transmits the fluorescent light and a second optical filter that transmits the scattered light on an optical path for image formation. In this case, splitting of the fluorescent light and the scattered light can be realized with a simple configuration.

Further, the image formation unit may include a light splitting element that splits the fluorescent light and the scattered light, and the imaging unit may include a first photodetector that images at least a part of the fluorescent light split by the light splitting element, and a second photodetector that images at least a part of the scattered light split by the light splitting element. In this case, splitting of the fluorescent light and the scattered light can be realized with a simple configuration.

Further, the image formation unit may include a light splitting element that splits the fluorescent light and the scattered light, and the imaging unit may include a photodetector having a light reception surface including a first imaging area that images at least a part of the fluorescent light split by the light splitting element and a second imaging area that images at least a part of the scattered light split by the light splitting element. In this case, splitting of the fluorescent light and the scattered light can be realized with a simple configuration.

Further, the image formation unit may have an observation axis that is inclined with respect to the irradiation surface. In this case, a field-of-view selection operation becomes unnecessary, and scanning and imaging of the sample can be performed simultaneously.

Therefore, improvement of a throughput until the fluorescent light image and the scattered light image are obtained can be achieved.

Further, a sample observation method according to an aspect of the present disclosure is a sample observation method for observing a sample held in a sample container using fluorescent light, and includes an irradiation step of irradiating the sample with planar light; a scanning step of scanning the sample in one direction with respect to an irradiation surface of the planar light; an image formation step of forming images of fluorescent light and scattered light generated in the sample due to the irradiation with the planar light; an imaging step of capturing at least a part of a light image of the fluorescent light formed in the image formation step and outputting first image data, and capturing at least a part of a light image of the scattered light formed in the image formation step and outputting second image data; an image processing step of generating a fluorescent light image on the basis of a plurality of pieces of first image data obtained for the one direction and generating a scattered light image on the basis of a plurality of pieces of second image data obtained for the one direction; and an analysis step of specifying an area in which there is the sample in the fluorescent light image on the basis of the scattered light image, setting an analysis area in the fluorescent light image on the basis of the area in which there is the sample, and analyzing an intensity of the fluorescent light in the analysis area.

In this sample observation method, the fluorescent light image is generated on the basis of the fluorescent light from the sample, and the scattered light image is generated on the basis of the scattered light from the sample. From the scattered light image, a contour shape of the sample can be specified. Therefore, an area in which there is the sample can be specified with sufficient accuracy from the contour shape of the sample specified on the basis of the scattered light image. The analysis of the sample can be performed with high accuracy by setting the analysis area on the basis of the specified area in which there is the sample in the fluorescent light image and obtaining the intensity of the fluorescent light of the analysis area.

Further, the sample observation method may include a switching step of switching between a first optical filter that transmits the fluorescent light and a second optical filter that transmits the scattered light on an optical path for image formation. In this case, splitting of the fluorescent light and the scattered light can be realized with a simple configuration.

Further, the sample observation method may include a light splitting step of splitting the fluorescent light and the scattered light, and the imaging step may include a first imaging step of imaging at least a part of the fluorescent light split by the light splitting element, and a second imaging step of imaging at least a part of the scattered light split by the light splitting element. In this case, splitting of the fluorescent light and the scattered light can be realized with a simple configuration.

Further, the sample observation method may include a light splitting step of splitting the fluorescent light and the scattered light, and the imaging step may include imaging at least a part of the fluorescent light split by the light splitting element and imaging at least a part of the scattered light split by the light splitting element by a photodetector having a light reception surface including a first imaging area and a second imaging area. In this case, splitting of the fluorescent light and the scattered light can be realized with a simple configuration.

Further, in the image formation step, the fluorescent light and the scattered light generated in the sample due to the irradiation with the planar light may be formed as images using an imaging unit having an observation axis inclined with respect to the irradiation surface. In this case, a field-of-view selection operation becomes unnecessary, and scanning and imaging of the sample can be performed simultaneously. Therefore, improvement of a throughput until the fluorescent light image and the scattered light image are obtained can be achieved.

Advantageous Effects of Invention

According to the present disclosure, the analysis area can be specified with sufficient accuracy.

DESCRIPTION OF EMBODIMENTS

Hereinafter, preferred embodiments of a sample observation device and a sample observation method according to an aspect of the present invention will be described in detail with reference to the drawings.

Figure 1:
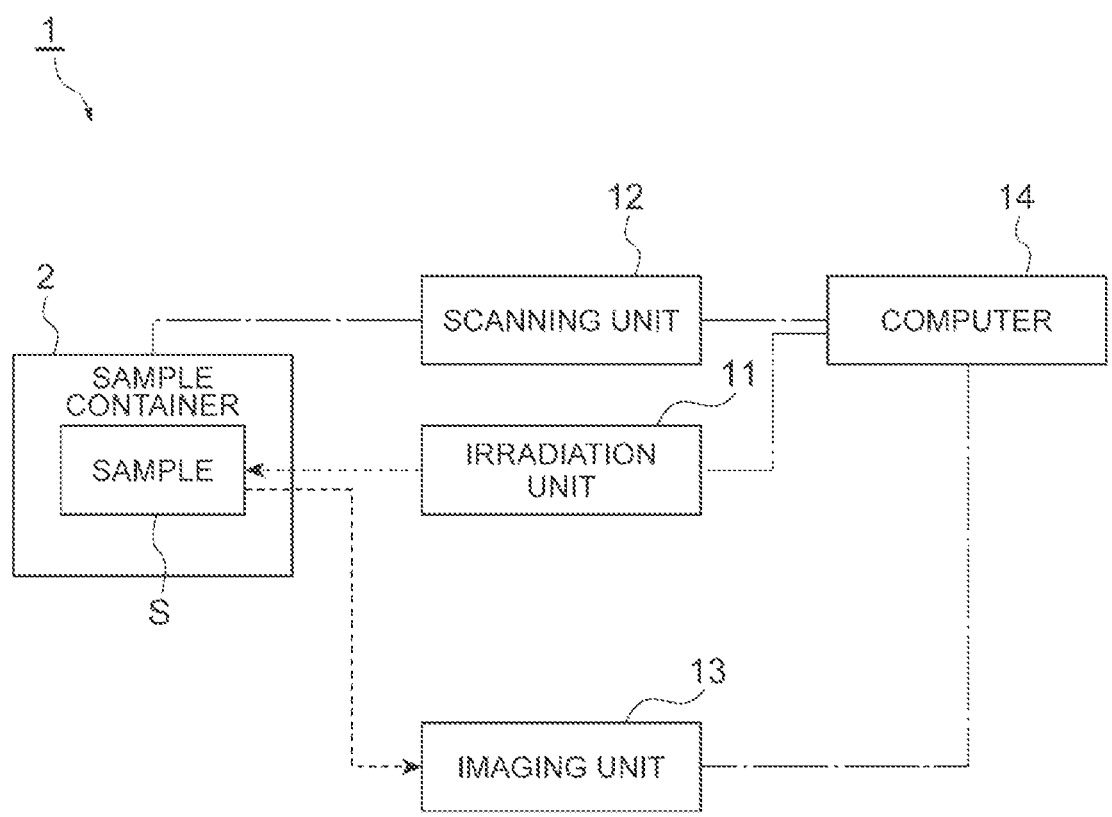
FIG. 1 is a block diagram illustrating an embodiment of a sample observation device.

FIG. 1 is a block diagram illustrating an embodiment of a sample observation device. This sample observation device 1 is a device that causes fluorescent light or scattered light generated in a sample S to be formed as an image on an image formation surface to acquire observation image data of the sample S, and analyzes and evaluates the sample S on the basis of the observation image data.

An example of this type of sample observation device includes a slide scanner that acquires and displays an image of the sample S held on a slide glass, or a plate reader that acquires image data of the sample S held on a microplate and analyzes the image data. Examples of the sample S that is an observation target include a cell and tissue of a human or an animal. The sample S is stained with a fluorescent substance that is excited by the planar light L2 (see FIG. 2). Examples of the fluorescent substance include calcein AM with which living cells are specifically stained, and fluorescent antibodies that are specifically bound to surface antigens of cells (for example, antibodies labeled with fluorescent substance fluorescein). The sample S may be stained with fluorescent substances of a plurality of different types.

Figure 2:
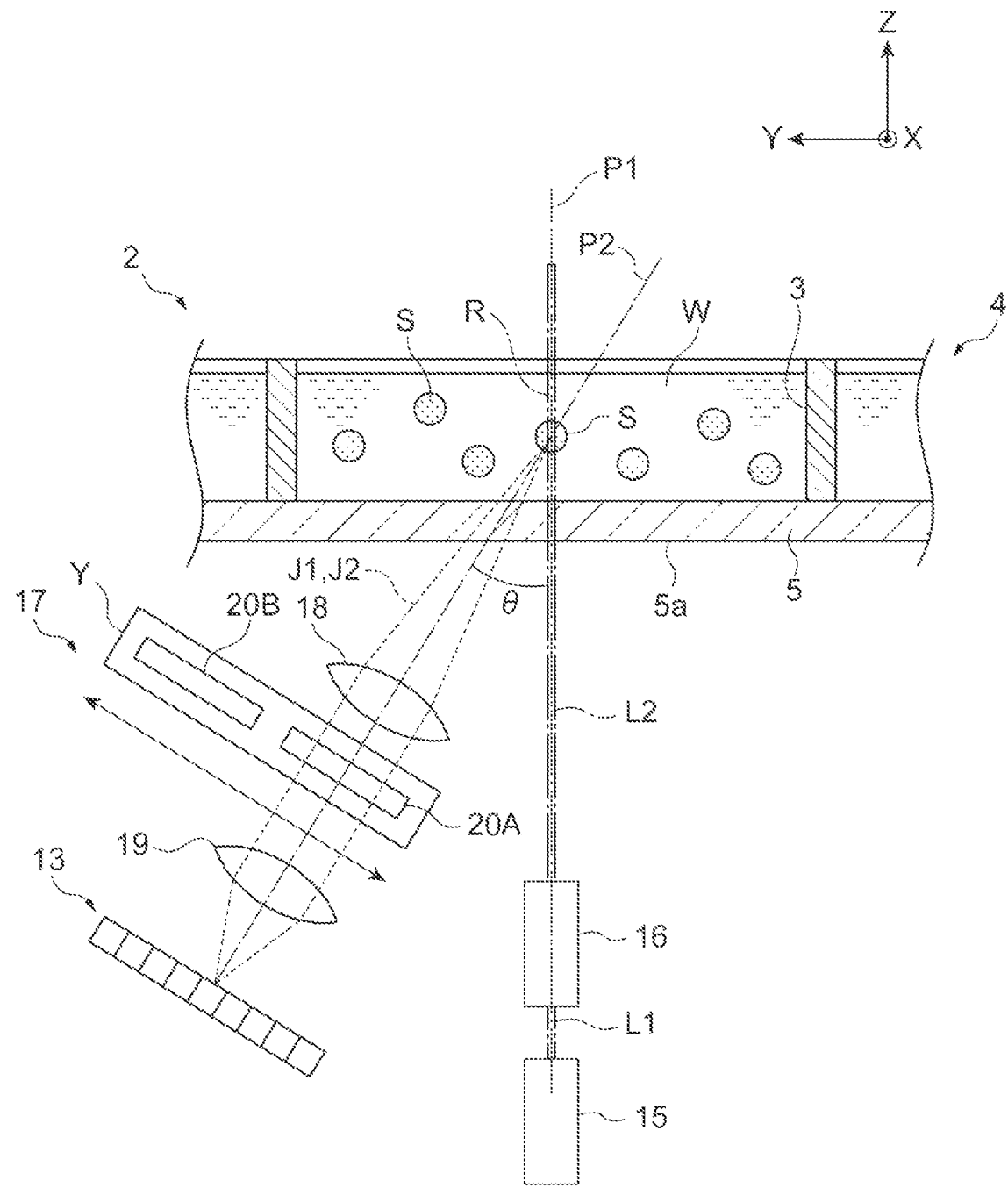
FIG. 2 is a schematic diagram illustrating a configuration example of an irradiation unit, a sample container, and an image formation unit in the sample observation device illustrated in FIG. 1.

The sample S is held in a sample container 2 as illustrated in FIG. 2. The sample container 2 is, for example, a microplate. The sample container 2 includes a plate-like main body 4 in which a plurality of wells 3 in which the samples S are disposed are arranged in a straight line (or a matrix form), and a plate-like transparent member 5 provided to close one end side of the well 3 on one surface side of the main body 4.

The transparent member 5 has an input surface 5a for the planar light L2 with respect to the sample S disposed in the well 3. A material of the transparent member 5 is not particularly limited as long as the material is a member having a high transmittance with respect to a wavelength of the planar light L2 (for example, a transmittance of 70% or more), but is, for example, a glass, quartz, or synthetic resin. The other end side of the well 3 is open to the outside. When the samples S are disposed in the well 3, the well 3 may be filled with a medium such as water.

As illustrated in FIG. 1, the sample observation device 1 includes an irradiation unit 11, a scanning unit 12, an imaging unit 13, and a computer 14. The irradiation unit 11 irradiates the sample S with the planar light L2 as excitation light. The irradiation unit 11 includes a light source 15 and a planar light formation unit 16, as illustrated in FIG. 2. The light source 15 outputs light L1 that is a formation source of the planar light L2. Examples of the light source 15 include a laser light source such as a laser diode and a solid-state laser light source. Further, the light source 15 may be a light emitting diode, a super luminescent diode, or a lamp light source. The light L1 output from the light source 15 is guided to the planar light formation unit 16.

The planar light formation unit 16 shapes the light L1 output from the light source 15 into the planar light L2, and irradiates the sample S with the shaped planar light L2 along the optical axis P1. In the embodiment, an optical axis of the planar light formation unit 16 is the optical axis P1 of the planar light L2. The planar light formation unit 16 includes a light shaping element such as a cylindrical lens, an axicon lens, or a spatial light modulator, and is optically coupled to the light source 15. The planar light formation unit 16 may include an objective lens, an optical shutter, and the like.

When observation is performed in a thickness direction of the sample S, it is preferable for the planar light L2 to be thin planar light having a thickness of 2 mm or less in consideration of resolution. Further, when a thickness of the sample S is very small, that is, when a sample S having a thickness equal to or less than a Z-direction resolution is observed, a thickness of the planar light L2 does not affect the resolution. In this case, planar light L2 having a thickness exceeding 2 mm may be used. The sample S held in the sample container 2 is irradiated with the planar light L2 formed by the irradiation unit 11. Observation light is generated on the irradiation surface R for the planar light L2 through the irradiation with the planar light L2. The observation light includes, for example, fluorescent light J1 excited in the sample S by the planar light L2 and scattered light J2 of the planar light L2 scattered at a surface of the sample S.

The scanning unit (scanner) 12 is a mechanism that scans the sample S with respect to the irradiation surface R for the planar light L2. The scanning unit 12 includes a moving stage that moves the sample container 2 that holds the samples S, for example. The moving stage scans the sample container 2 in a preset direction according to a control signal from the computer 14. In the embodiment, the moving stage scans the sample container 2 in one direction within a plane orthogonal to the optical axis P1 of the planar light L2. In the following description, a direction of the optical axis P1 of the planar light L2 is referred to as a Z axis, a scanning direction of the sample container 2 according to the moving stage is referred to as a Y axis, and a direction orthogonal to the Y axis within the plane orthogonal to the optical axis P1 of the planar light L2 is referred to as an X axis, as illustrated in FIG. 2. The irradiation surface R for the planar light L2 with respect to the sample S is a surface within the XZ plane.

In the embodiment, an image formation unit 17 that forms images of the fluorescent light J1 and the scattered light J2 generated in the sample S due to the irradiation with the planar light L2 is provided. The image formation unit 17 includes, for example, a collimator lens 18, an image formation lens 19, a first optical filter 20A, a second optical filter 20B, and a switching unit Y.

The collimator lens 18 is a lens that collimates the fluorescent light J1 or the scattered light J2 generated on the irradiation surface R. Further, the image formation lens 19 is a lens that forms an image of the fluorescent light J1 or the scattered light J2 that has been collimated by the collimator lens 18. The first optical filter 20A is an optical filter that transmits the fluorescent light J1 and cuts light having other wavelengths. The second optical filter 20B is an optical filter that transmits the scattered light J2 and cuts light having other wavelengths.

The switching unit Y includes, for example, a switching stage on which the first optical filter 20A and the second optical filter 20B are placed. The switching stage is disposed on an optical path for image formation between the collimator lens 18 and the image formation lens 19. The switching unit Y drives the switching stage in a direction crossing the optical axis of the image formation unit 17 in synchronization with driving of the light source 15 according to a control signal from the computer 14, and switches between the first optical filter 20A that transmits the fluorescent light J1 and the second optical filter 20B that transmits the scattered light J2, on the optical path for image formation. When the first optical filter 20A has advanced onto the optical path for image formation by the switching unit Y, only the fluorescent light J1 is imaged as an image by the image formation unit 17. On the other hand, when the second optical filter 20B has advanced onto the optical path for image formation by the switching unit Y, only the scattered light J2 is formed as an image by the image formation unit 17. The switching unit Y may include a filter wheel on which the first optical filter 20A and the second optical filter 20B are placed.

The optical axis of the image formation unit 17 is an observation axis P2 of the fluorescent light J1 and the scattered light J2. This observation axis P2 is inclined at an inclination angle $\theta$ with respect to the irradiation surface R for the planar light L2. The inclination angle $\theta$ also matches an angle formed by the optical axis P1 of the planar light L2 directed to the sample S and the observation axis P2. The inclination angle $\theta$ is, for example, 10° to 80°. The inclination angle $\theta$ is preferably 20° to 70° from the viewpoint of improvement of resolution of the observation image. Further, the inclination angle $\theta$ is more preferably 30° to 65° from the viewpoint of improvement of the resolution of the observation image and stability of the field of view.

The imaging unit 13 captures at least a part of an optical image of the fluorescent light J1 and at least a part of an optical image of the scattered light J2 formed as images by the image formation unit 17. An example of the photodetector constituting the imaging unit 13 includes an area image sensor such as a CMOS image sensor and a CCD image sensor. The area image sensor is disposed on an image formation surface of the image formation unit 17 and captures an optical image, for example, using a global shutter or a rolling shutter to generate two-dimensional image data.

The imaging unit 13 outputs first image data based on the at least the part of the light image of the fluorescent light J1 and second image data based on the at least the part of the light image of the scattered light J2 to the computer 14. As described above, in the sample observation device 1, the sample container 2 is scanned in a Y-axis direction (one direction) with respect to the irradiation surface R, and the light image of the fluorescent light J1 and the light image of the scattered light J2 from the irradiation surface R are captured by the imaging unit 13. That is, the imaging unit 13 generates a plurality of pieces of first image data (XZ images) and a plurality of pieces of second image data (XZ images) in the Y-axis direction.

Figure 3A:
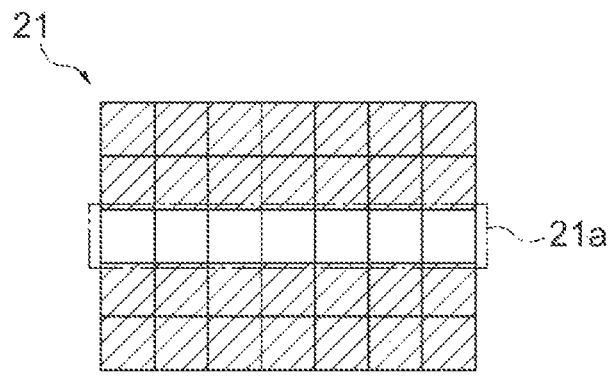
FIGS. 3A-3D diagrams illustrating a configuration example of an imaging unit.
Figure 3B:
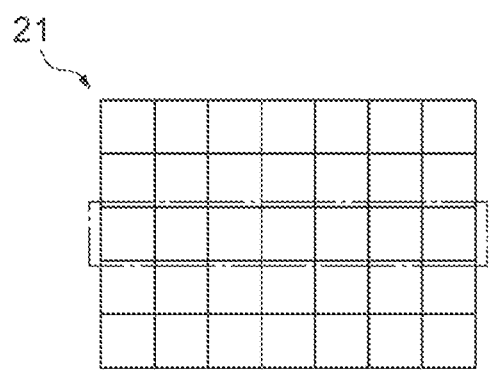

In the imaging unit 13, a line scan scheme may be applied to the photodetector to partially image the fluorescent light J1 and the scattered light J2 from the irradiation surface R. For example, as illustrated in FIG. 3A, a subarray may be set on an imaging surface of the area image sensor 21. In this case, since only a pixel row 21a included in the subarray can be read, the light image of the fluorescent light J1 or the scattered light J2 can be partially captured. Further, all pixel rows of the area image sensor 21 may be used as a readout area, and a part of the two-dimensional image may be extracted through a subsequent image process, as illustrated in FIG. 3B.

Figure 3C:
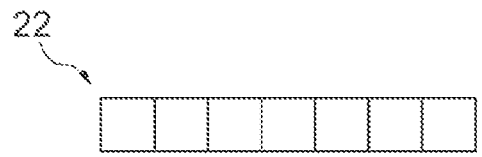
Figure 3D:
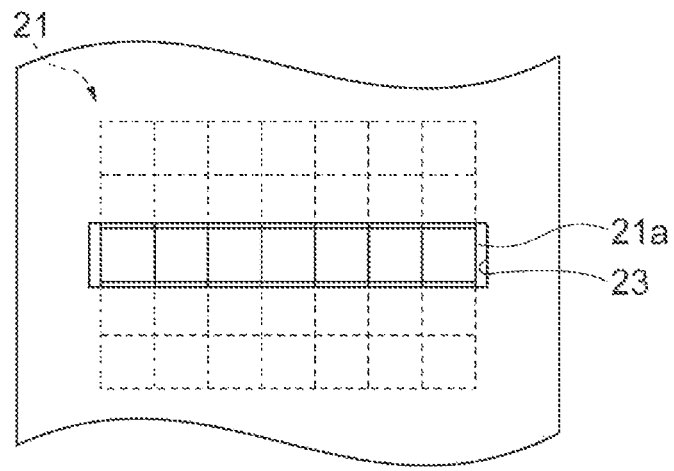

Further, partial imaging may be performed by using a photodetector such as a line sensor 22 instead of the area image sensor 21 and limiting the imaging surface itself to one pixel row, as illustrated in FIG. 3C. As illustrated in FIG. 3D, a slit 23 that transmits only a part of the fluorescent light J1 or the scattered light J2 may be disposed on a front surface of the area image sensor 21, and image data of the pixel row 21a corresponding to the slit 23 may be acquired. When the slit 23 is used, a photodetector such as a point sensor of a photomultiplier tube or the like may be used instead of the area image sensor.

The computer 14 physically includes a memory such as a RAM and a ROM, a processor (an arithmetic circuit) such as a CPU, a communication interface, a storage unit such as a hard disk, and a display unit such as a display. Examples of such a computer 14 include a personal computer, a microcomputer, a cloud server, and a smart device (a smart phone, a tablet terminal, or the like). The computer 14 functions as a controller that controls operations of the light source 15, the scanning unit 12, the switching unit Y, and the imaging unit 13 by a program stored in the memory being executed by a CPU of a computer system.

The computer 14 as the controller receives an input of a measurement start operation from the user, and drives the light source 15, the scanning unit 12, and the imaging unit 13 in synchronization. Accordingly, the sample container 2 is scanned in the Y direction with respect to the irradiation surface R for the planar light L2, and a plurality of XZ images of the fluorescent light J1 and the scattered light J2 from the irradiation surface R are captured by the imaging unit 13. The computer 14 may control the light source 15 so that the light source 15 continuously outputs the light L1 during movement of the sample container 2 by the scanning unit 12, or may control ON/OFF of the output of the light L1 from the light source 15 according to the imaging in the imaging unit 13. Further, when the irradiation unit 11 includes an optical shutter, the computer 14 may turn ON/OFF the irradiation with the light L1 by controlling the optical shutter.

Figure 4:
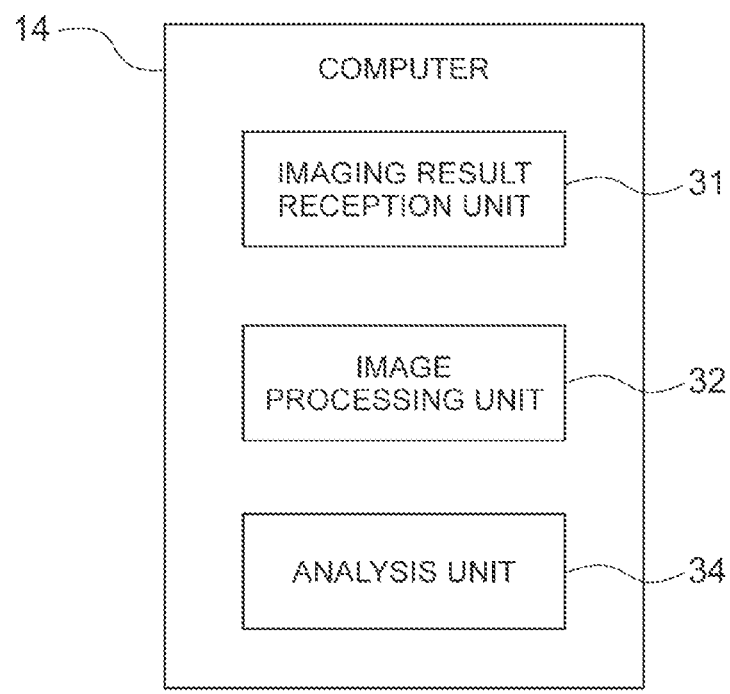
FIG. 4 is a block diagram illustrating an example of functional components of a computer constituting the sample observation device.

Further, the computer 14 includes an imaging result reception unit 31, an image processing unit 32, and an analysis unit 33 as functional components, as illustrated in FIG. 4. The imaging result reception unit 31 is a unit that receives imaging data from the imaging unit 13. That is, the imaging result reception unit 31 receives the first image data based on at least a part of the light image of the fluorescent light J1 and the second image data based on at least a part of the light image of the scattered light J2 from the imaging unit 13 and outputs the image data to the image processing unit 32.

Figure 5A:
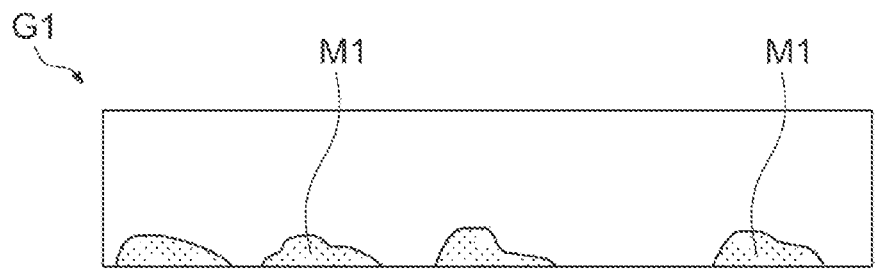
FIG. 5A is a diagram illustrating an example of first image data.
Figure 5B:
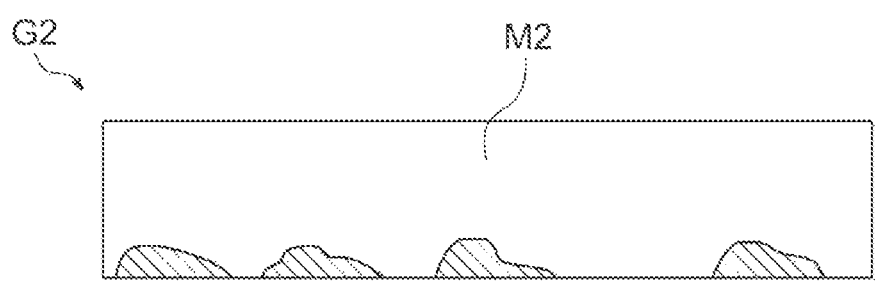
FIG. 5B is a diagram illustrating an example of second image data.

FIG. 5A illustrates an example of the first image data. The first image data G1 corresponds to an XZ image of the fluorescent light J1 generated in the sample S. The fluorescent light J1 is generated when the fluorescent substance with which the sample S is stained is excited by the planar light L2. Therefore, the fluorescent light image M1 corresponding to the sample S can appear in the first image data G1. FIG. 5B is a diagram illustrating an example of the second image data. The second image data G2 corresponds to an XZ image of the scattered light J2 generated in the sample S. The scattered light J2 is generated by the planar light being scattered on the surface of the sample S. Therefore, a scattered light image M2 corresponding mainly to a contour shape of the sample S can appear in the second image data G2.

Figure 6A:
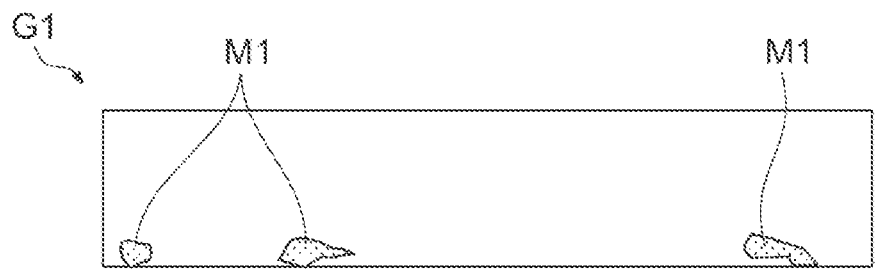
FIG. 6A is a diagram illustrating another example of the first image data.
Figure 6B:
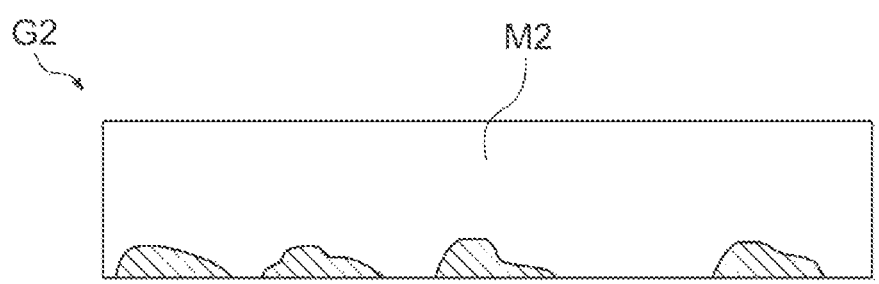
FIG. 6B is a diagram illustrating another example of the second image data.

FIG. 6A is a diagram illustrating another example of the first image data. In this example, the fluorescent light J1 is generated in some of the samples S. Further, there are samples S in which no fluorescent light J1 is generated. Therefore, in this other example, the fluorescent light image M1 corresponding to some of the samples may appear in the first image data G1. FIG. 6B is a diagram illustrating another example of the second image data. Even when the fluorescent light J1 is generated in some of the samples S, the scattered light J2 is generated in the same manner as in FIG. 5B since the planar light is scattered on the surface of the sample S. Therefore, in this other example, the fluorescent light image M1 in the first image data G1 and the scattered light image M2 in the second image data G2 do not match.

The image processing unit 32 generates a fluorescent light image and a scattered light image. The image processing unit 32 receives a plurality of pieces of first image data G1 obtained in the Y-axis direction and a plurality of pieces of second image data G2 obtained in the Y-axis direction from the imaging result reception unit 31. The image processing unit 32 compresses the plurality of received pieces of first image data G1 and the plurality of received pieces of second image data G2 in the Z direction. The plurality of pieces of first image data G1 compressed in the Z-axis direction indicates a luminance of the fluorescent light in the X-axis direction, and the plurality of pieces of second image data G2 compressed in the Z-axis direction indicates a luminance of the scattered light in the X-axis direction. The image processing unit 32 synthesizes, in the Y-axis direction, a plurality of pieces of image data compressed in the Z-axis direction, for the first image data G1 and the second image data G2, and integrates the luminance of the fluorescent light and the intensity of the scattered light in each piece of image data to generate a fluorescent light image and a scattered light image. The image processing unit 32 outputs the generated fluorescent light image and scattered light image to the analysis unit 33.

Figure 7A:
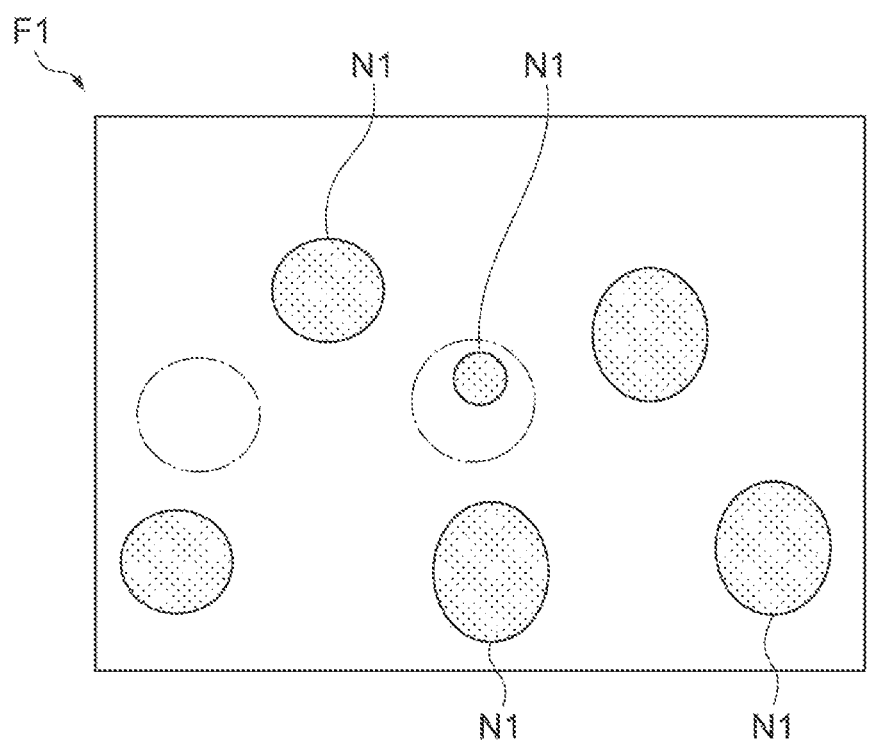
FIG. 7A is a diagram illustrating an example of a fluorescent light image.
Figure 7B:
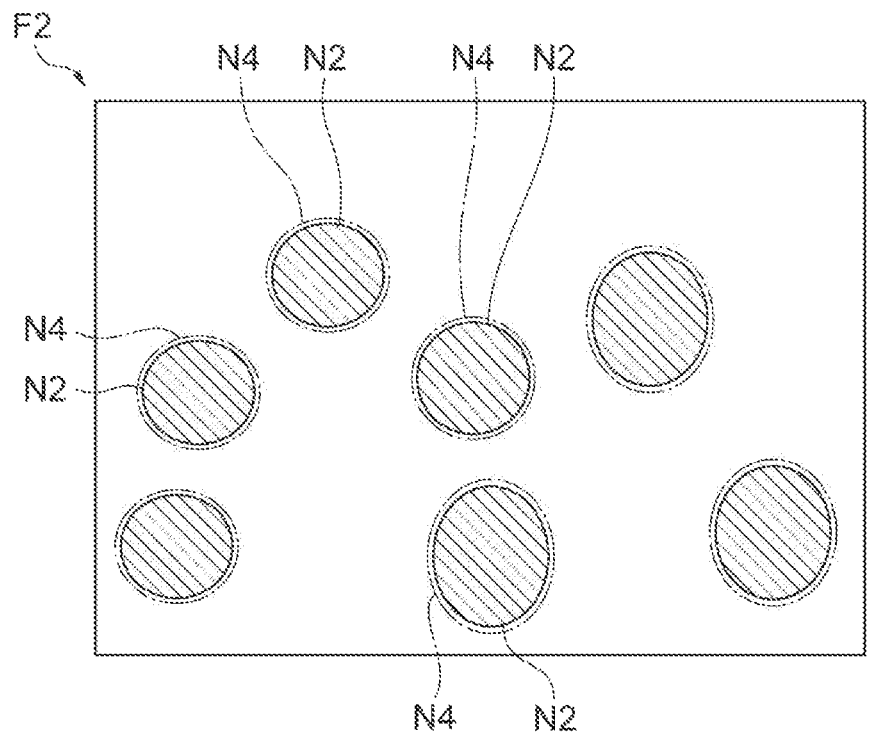
FIG. 7B is a diagram illustrating an example of a scattered light image.

FIG. 7A illustrates an example of the fluorescent light image. The fluorescent light image F1 is an image obtained by synthesizing, in the Y-axis direction, the plurality of pieces of first image data G1 compressed in the Z-axis direction, and the fluorescent light image N1 appearing in the fluorescent light image F1 is an XY image of the fluorescent light corresponding to the sample S. In FIG. 7A, a portion in which the fluorescent light J1 is generated in some of the samples S, and a portion in which the fluorescent light J1 is not generated in the sample S are included. Further, FIG. 7B is a diagram illustrating an example of the scattered light image. The scattered light image F2 is an image obtained by synthesizing, in the Y-axis direction, the plurality of pieces of second image data G2 compressed in the Z-axis direction, and the scattered light image N2 appearing in the scattered light image F2 is an XY image of the scattered light corresponding to the contour shape of the sample S.

Figure 8:
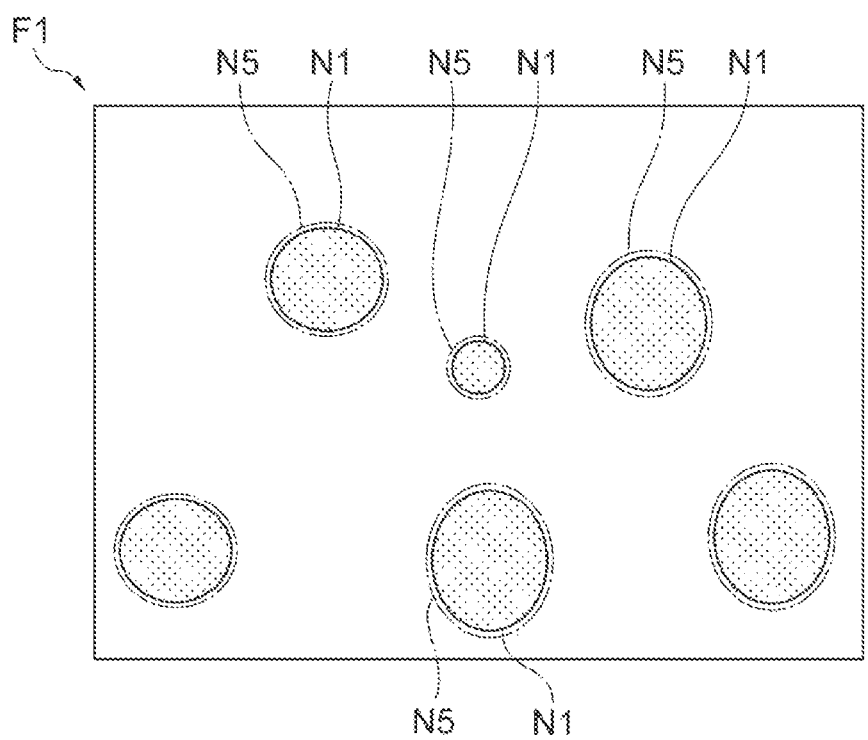
FIG. 8 is a diagram illustrating a state of setting of an analysis area in the fluorescent light image.

The analysis unit 33 analyzes the intensity of the fluorescent light in an analysis area N5. When the analysis unit 33 receives the fluorescent light image F1 and the scattered light image F2 from the image processing unit 32, the analysis unit 33 first extracts a contour shape of the scattered light image N2 appearing in the scattered light image F2 as an area N4 in which there is the sample S (FIG. 7B). Then, as illustrated in FIG. 8, the analysis unit 33 assigns the area N4 in which there is the sample S to the fluorescent light image F1 as the analysis area N5, and sets the analysis area N5 in the fluorescent light image F1. The analysis unit 33 analyzes the intensity of the fluorescent light in the set analysis area N5 on the basis of the fluorescent light image F1.

Figure 9:
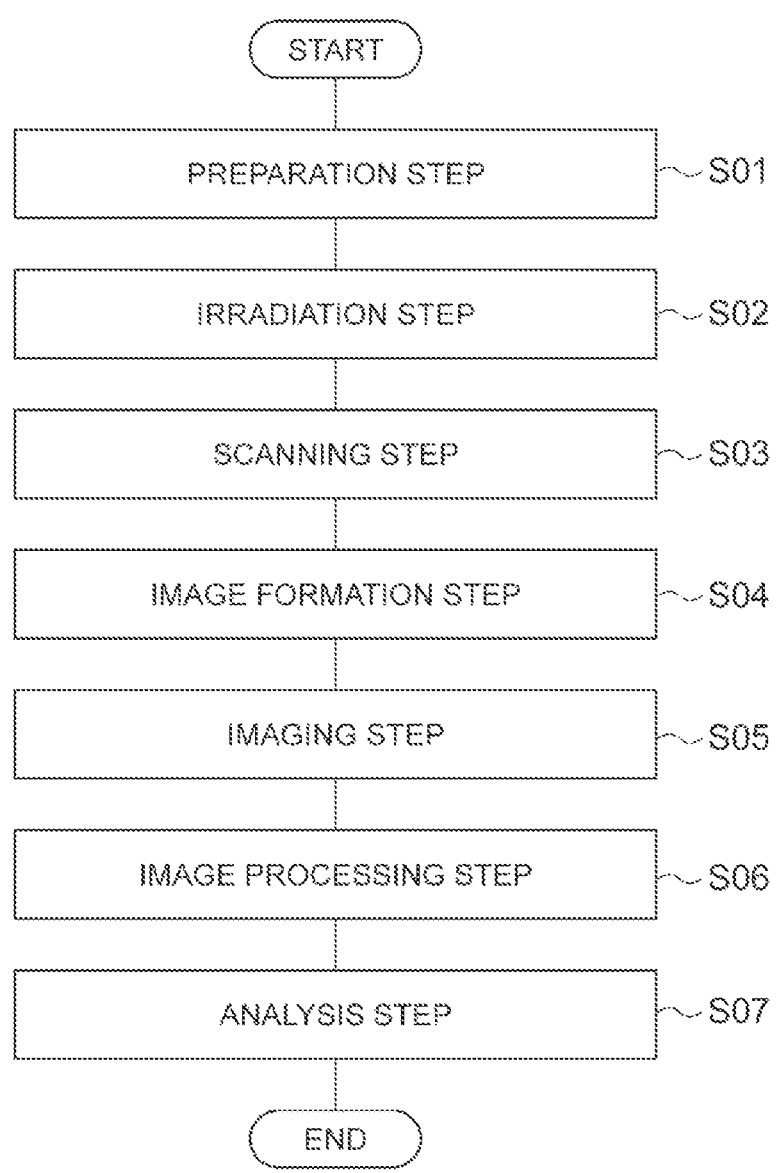
FIG. 9 is a flowchart illustrating an example of a sample observation method using the sample observation device illustrated in FIG. 1.

Next, a sample observation method using the sample observation device 1 described above will be described. FIG. 9 is a flowchart illustrating an example of the sample observation method using the sample observation device 1 illustrated in FIG. 1.

As illustrated in FIG. 9, this sample observation method includes a preparation step (step S01), an irradiation step (step S02), a scanning step (step S03), an image formation step (step S04), and an imaging step (step S05), an image processing step (step S06), and an analysis step (step S07).

In the preparation step, the sample S is held in the sample container 2. Here, the sample S is stained with a fluorescent substance and held in the well 3. After the sample S is held in the well 3, the sample container 2 is set in the scanning unit 12.

In the irradiation step, the well 3 of the sample container 2 is irradiated with the planar light L2. When a measurement start operation is input to the sample observation device 1 by the user, the light source 15 is driven on the basis of a control signal from the computer 14, and the light L1 that is a formation source of the planar light L2 is radiated. The light L1 output from the light source 15 is shaped by the planar light formation unit 16 to become the planar light L2, and the sample S held in the sample container 2 is irradiated with the planar light L2.

In the scanning step, the sample container 2 is scanned with respect to the irradiation surface R for the planar light L2. When the measurement start operation is input by the user, the scanning unit 12 is driven in synchronization with the driving of the light source 15 on the basis of a control signal from the computer 14. Accordingly, the sample container 2 is linearly driven at a constant speed in the Y-axis direction, and the sample S in the well 3 is scanned with respect to the irradiation surface R for the planar light L2.

In the image formation step, the fluorescent light J1 and the scattered light J2 generated in the sample S due to the irradiation with the planar light L2 are formed as images. In the image formation step, the fluorescent light J1 and the scattered light J2 are formed as images on the light reception surface of the photodetector according to the observation axis P2 inclined with respect to the irradiation surface R. In the image formation step, the switching unit Y may be driven according to a control signal from the computer 14 to switch between the first optical filter 20A and the second optical filter 20B on the optical path for image formation (switching step). When the first optical filter 20A has advanced onto the optical path for image formation, only the fluorescent light J1 is formed as an image by the image formation unit 17. On the other hand, when the second optical filter 20B has advanced onto the optical path for image formation, only the scattered light J2 is formed as an image by the image formation unit 17.

In the imaging step, at least a part of the optical image of the fluorescent light J1 and at least a part of the optical image of the scattered light J2 formed as images by the image formation unit 17 are captured. In the imaging step, a plurality of pieces of first image data G1 based on the at least part of the optical image of the fluorescent light J1 and a plurality of pieces of second image data G2 based on the at least part of the optical image of the scattered light J2 are generated in the Y-axis direction and output to the computer 14.

In the image processing step, the fluorescent light image F1 and the scattered light image F2 are generated. In the image processing step, first, the plurality of pieces of first image data G1 and the plurality of pieces of second image data G2 obtained in the imaging step are compressed in the Z direction. Then, for each of the first image data G1 and the second image data G2, the plurality of pieces of image data compressed in the Z-axis direction is synthesized in the Y-axis direction, and luminance of the fluorescent light or scattered light luminance in each piece of image data is integrated. Accordingly, the fluorescent light image H that is an XY image of the fluorescent light corresponding to the sample S and the scattered light image F2 that is an XY image of the scattered light corresponding to the contour shape of the sample S are generated.

In the analysis step, an intensity of the fluorescent light in the analysis area N5 is analyzed. In the analysis step, first, the contour shape of the scattered light image N2 appearing in the scattered light image F2 is extracted as the area N4 in which there is the sample S. The area N4 in which there is the sample S is assigned to the fluorescent light image F1 as the analysis area N5, and the analysis area N5 in the fluorescent light image F1 is set. The intensity of the fluorescent light in the set analysis area N5 is analyzed on the basis of the fluorescent light image F1.

The sample observation device 1 generates the fluorescent light image H on the basis of the fluorescent light J1 from the sample S, and generates the scattered light image F2 on the basis of the scattered light J2 from the sample S. From the scattered light image F2, the contour shape of the sample S can be specified. Therefore, the area N4 in which there is the sample S can be specified with sufficient accuracy in the fluorescent light image F1 by applying the contour shape of the sample S specified on the basis of the scattered light image F2 to the fluorescent light image F1. The analysis of the sample S can be performed with high accuracy by obtaining the intensity of the fluorescent light of the specified area N4 in which there is the sample S in the fluorescent light image F1.

Further, in the sample observation device 1, the switching unit Y that switches between the first optical filter 20A that transmits the fluorescent light J1 and the second optical filter 20B that transmits the scattered light J2, on the optical path for image formation is provided in the image formation unit 17. Accordingly, splitting of the fluorescent light J1 and the scattered light J2 can be realized with a simple configuration.

Further, in the sample observation device 1, the light L1 from the light source 15 is shaped into the planar light L2 by the planar light formation unit 16. Accordingly, in the imaging unit 13, it becomes possible to acquire the first image data G1 and the second image data G2 as two-dimensional data. Further, in the sample observation device 1, the image formation unit 17 has the observation axis P2 that is inclined with respect to the irradiation surface R for the planar light L2. Accordingly, a field-of-view selection operation becomes unnecessary, and scanning and imaging of the sample S can be performed simultaneously. Therefore, improvement of a throughput until the fluorescent light image F1 and the scattered light image F2 are obtained can be achieved.

Figure 10:
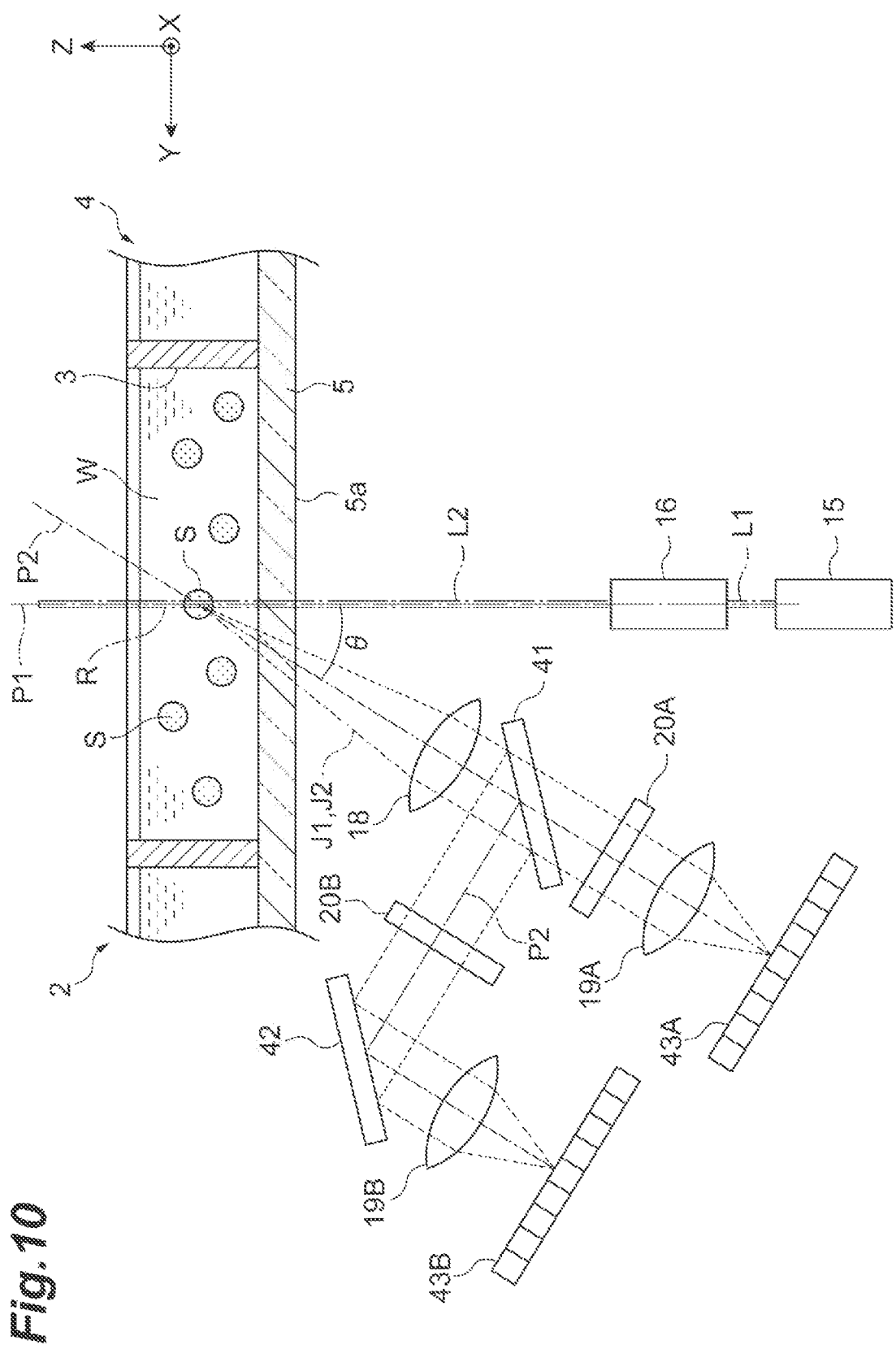
FIG. 10 is a schematic diagram illustrating a modification example of an image formation unit.

The present disclosure is not limited to the above embodiment. For example, in the image formation step, the fluorescent light J1 and the scattered light J2 generated in the sample S due to the irradiation with the planar light L2 may be split by a light splitting element (a light splitting step). In this case, the image formation unit 17 includes a collimator lens 18, image formation lenses 19A and 19B, a beam splitter (light splitting element) 41, a mirror 42, a first optical filter 20A, and a second optical filter 20B, as illustrated in FIG. 10. In the example of FIG. 10, the imaging unit 13 includes a first photodetector 43A and a second photodetector 43B. As the beam splitter 41, for example, a dichroic mirror can be used.

The beam splitter 41 and the first optical filter 20A are disposed on the optical path for image formation between the collimator lens 18 and the image formation lens 19A. The fluorescent light J1 is collimated by the collimator lens 18 and transmitted through the beam splitter 41 and the first optical filter 20A. The fluorescent light J1 transmitted through the first optical filter 20A is formed as an image on a light reception surface of the first photodetector 43A by the image formation lens 19A. The first photodetector 43A captures at least a part of the optical image of the fluorescent light J1, and outputs the first image data G1 to the computer 14.

The second optical filter 20B and the mirror 42 are disposed on the optical path for image formation between the collimator lens 18 and the image formation lens 19B. The scattered light J2 is collimated by the collimator lens 18, reflected by the beam splitter 41, and then transmitted through the second optical filter 20B. The scattered light J2 transmitted through the second optical filter 20B is reflected by the mirror 42 and formed as an image on a light reception surface of the second photodetector 43B by the image formation lens 19B. The second photodetector 43B captures at least a part of the optical image of the scattered light J2, and outputs the second image data G2 to the computer 14. In such a configuration, splitting of the fluorescent light J1 and the scattered light J2 can be realized with a simple configuration.

Figure 11:
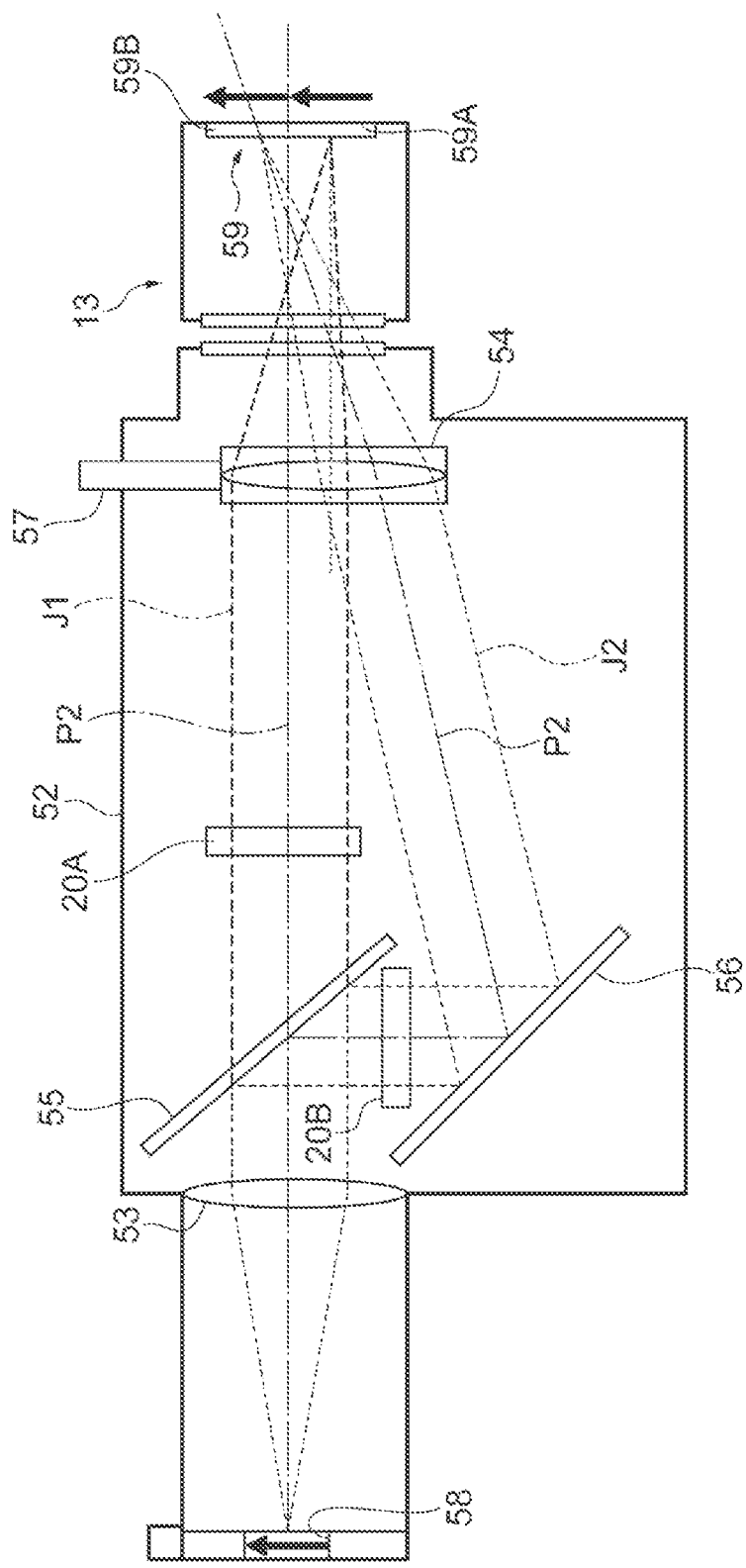
FIG. 11 is a schematic diagram illustrating a further modification example of the image formation unit.

Further, the image formation unit may include a light splitting device 51 as illustrated in FIG. 11. The light splitting device 51 includes a collimator lens 53, an image formation lens 54, a beam splitter (a light splitting element) 55, a mirror 56, a first optical filter 20A, a second optical filter 20B, and an image formation lens moving mechanism 57 in a housing 52. A field-of-view stop 58 is provided at a light incidence end of the housing 52. The field-of-view stop 58 has a variable width in a direction perpendicular to the observation axis P2. As the beam splitter 55, for example, a dichroic mirror can be used.

The beam splitter 55 and the first optical filter 20A are disposed on the optical path for image formation between the collimator lens 53 and the image formation lens 54. The fluorescent light J1 incident on the housing 52 through the field-of-view stop 58 is collimated by the collimator lens 53, transmitted through the beam splitter 55 and the first optical filter 20A, and guided to the image formation lens 54. Further, the second optical filter 20B and the mirror 56 are disposed on the optical path for image formation between the collimator lens 53 and the image formation lens 54. The scattered light J2 incident on the housing 52 through the field-of-view stop 58 is collimated by the collimator lens 53, reflected by the beam splitter 55, and then transmitted through the second optical filter 20B. The scattered light J2 transmitted through the second optical filter 20B is reflected by the mirror 56 and guided to the image formation lens 54.

Here, the image formation lens 54 is shifted by a predetermined distance from an optical axis of the fluorescent light J1 by the image formation lens moving mechanism 57. Further, the photodetector 59 in the imaging unit 13 has a light reception surface including a first imaging area (a lower half area of the photodetector 59 in FIG. 10) 59A and a second imaging area (an upper half area of the photodetector 59 in FIG. 10) 59B. Accordingly, the fluorescent light J1 formed as an image by the image formation lens 54 is formed as an image in the first imaging area 59A of the photodetector 59 in the imaging unit 13, whereas the scattered light J2 formed as an image by the image formation lens 54 is formed as an image in the second imaging area 59B of the photodetector 59 in the imaging unit 13. The photodetector 59 captures at least a part of the light image of the fluorescent light J1 in the first imaging area 59A, and captures at least a part of the light image of the scattered light J2 in the second imaging area 59B. In such a configuration, splitting of the fluorescent light J1 and the scattered light J2 can be realized with a simple configuration.

Further, although the irradiation unit 11 that outputs the planar light L2 and the imaging unit 13 that adopts the line scan scheme are combined, for example, in the above-described embodiment, another scheme may be adopted as long as a cross section in a depth direction of the well 3 in the sample container 2 can be measured at a time. For example, an optical system of oblique plane microscopy described in U.S. Pat. No. 8,582,203 may be adopted.

When the sample S is stained with fluorescent substances of a plurality of different types, a plurality of planar light L2 that excite the respective fluorescent substances may be output from the irradiation unit 11, and the imaging unit 13 may capture a plurality of fluorescent light images emitted from the respective fluorescent substances. In this case, the analysis unit 33 specifies the area N4 in which there is the sample S on the basis of the scattered light image F2, and then sets the analysis area N5 based on the area N4 in which there is the sample S for each of the fluorescent light images F1 obtained from the plurality of fluorescent light images. Accordingly, for example, the intensity of the fluorescent light emitted from each fluorescent substance with which the sample S has been stained can be analyzed accurately. Even when the sample S is stained with fluorescent substances of a plurality of different types, single planar light L2 may be output from the irradiation unit 11 in a case in which the plurality of fluorescent substances are excited at the same wavelength. Further, even when the sample S is stained with fluorescent substances of a plurality of different types, fluorescent light emitted from each fluorescent substance may be imaged through a plurality of imaging in a case in which the plurality of fluorescent substances emit fluorescent light having the same wavelength.

Figure 12:
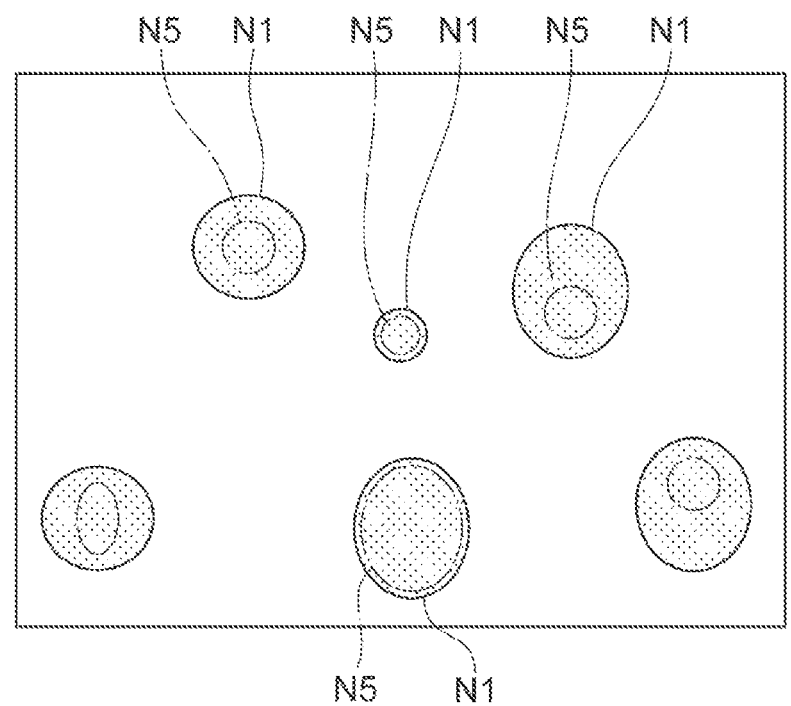
FIG. 12 is a diagram illustrating a modification example of a state of setting of the analysis area in the fluorescent light image.

Further, the area N4 in which there is the sample S and the analysis area N5 do not necessarily match each other. For example, the analysis area N5 may be set partially inside the fluorescent light image N1 appearing in the fluorescent light image F1 (inside the area N4 in which there is the sample S), as illustrated in FIG. 12.

REFERENCE SIGNS LIST

1: Sample observation device
2: Sample container
3: Well
11: Irradiation unit
12: Scanning unit
13: Imaging unit
17: Image formation unit
20A: First optical filter
20B: Second optical filter
32: Image processing unit
33: Analysis unit
41: Beam splitter (light splitting element)
43A: First photodetector
43B: Second photodetector
51: Light splitting device (image formation unit)
55: Beam splitter (light splitting element)
59: Photodetector
59A: First imaging area
59B: Second imaging area
L2: Planar light
J1: Fluorescent light
J2: Scattered light
G1: First image data
G2: Second image data
F1: Fluorescent light image
F2: Scattered light image
N4: Area in which there is sample
N5: Analysis area
S: Sample
R: Irradiation surface
P2: Observation axis
Y: Switching unit

The invention claimed is:

1. A system comprising:
an irradiation unit including a light source and configured to irradiate a sample with planar light along an XZ plane;
a moving stage configured to move the sample with respect to the XZ plane at a constant speed along a Y-axis direction;
an image formation unit including at least one lens and at least one filter and configured to form images of fluorescent light and scattered light generated in the sample in accordance with the irradiation with the planar light;
an imaging unit including at least one image sensor and configured to capture, while moving the sample by moving stage, the images of fluorescent light and scattered light, and output first XZ image data based on the image of fluorescent light and second XZ image data based on the image of scattered light; and
a computer configured to set an analysis area in which there is the sample and analyze an intensity of the fluorescent light in the analysis area based on the first image data and second image data,
wherein the image formation unit has an observation axis that is inclined with respect to the XZ plane.

2. The system according to claim 1, wherein the image formation unit includes a switching unit configured to switch between a first optical filter that transmits the fluorescent light and a second optical filter that transmits the scattered light on an optical path for image formation.

3. The system according to claim 1, further comprising:
a beam splitter configured to split the fluorescent light and the scattered light,
wherein the imaging unit includes a first image sensor is configured to capture the image of the fluorescent light split by the beam splitter, and a second image sensor is configured to capture the image of the scattered light split by the beam splitter.

4. The system according to claim 1, further comprising:
a beam splitter configured to split the fluorescent light and the scattered light,
wherein the image sensor having a light reception surface including a first imaging area is configured to capture the image of the fluorescent light split by the beam splitter and a second imaging area is configured to capture the image of the scattered light split by the beam splitter.

5. A method comprising:
irradiating a sample with planar light along an XZ plane;
moving the sample in a Y-axis direction with respect to the XZ plane;
forming images of fluorescent light and scattered light generated in the sample in accordance with the irradiation with the planar light;
capturing the image of the fluorescent light formed in the forming and outputting first XZ image data;
capturing the image of the scattered light formed in the forming and outputting second XZ image data; and
setting an analysis area in which there is the sample and analyzing an intensity of the fluorescent light in the analysis area based on the first image data and second image data,
wherein an observation axis is inclined with respect to the XZ plane.

6. The method according to claim 5, further comprising:
switching between a first optical filter that transmits the fluorescent light and a second optical filter that transmits the scattered light on an optical path for image formation.

7. The method according to claim 5, further comprising:
splitting the fluorescent light and the scattered light,
wherein the capturing the image of the fluorescent light and the capturing the image of the scattered light is performed by same image sensor.

8. The method according to claim 5, further comprising:
splitting the fluorescent light and the scattered light,
wherein the capturing the image of the fluorescent light and the capturing the image of the scattered light is performed by different image sensors.

* * * * *